(12) United States Patent
Kakani (10) Patent No.: US 7,813,307 B2
(45) Date of Patent: Oct. 12, 2010

(54) POWER SAVE IN IBSS MODE OF WLAN OPERATION

(75) Inventor: Naveen Kakani, Irving, TX (US)

(73) Assignee: Nokia Corporation

( * ) Notice: Subject to any disclaimer, the term of this patent is extended or adjusted under 35 U.S.C. 154(b) by 821 days.

(21) Appl. No.: 11/682,836

(22) Filed: Mar. 6, 2007

(65) Prior Publication Data

US 2007/0206517 A1 Sep. 6, 2007

Related U.S. Application Data

(60) Provisional application No. 60/813,590, filed on Mar. 6, 2006.

(51) Int. Cl.
G08C 17/00 (2006.01)
H04H 20/71 (2008.01)
H04W 4/00 (2009.01)
H04J 3/16 (2006.01)
H04M 1/00 (2006.01)

(52) U.S. Cl. .................. 370/311; 370/312; 370/346; 370/328; 455/574

(58) Field of Classification Search ......... 370/311–314, 370/328–330, 336–338, 341, 345–350, 449–450, 370/458–459, 310; 455/41.2, 127.1, 127.5, 455/343.1–343.5, 418–420, 522, 550.1, 556.2, 455/574, 466, 512–514, 515, 517

See application file for complete search history.

(56) References Cited

U.S. PATENT DOCUMENTS

| 7,245,946 | B2 * | 7/2007 | Liu ........................ 455/574 |
| 7,564,810 | B2 * | 7/2009 | Hernandez et al. ........ 370/311 |
| 2005/0190767 | A1 | 9/2005 | Lee et al. |
| 2006/0028984 | A1 * | 2/2006 | Wu et al. ................... 370/230 |
| 2006/0193279 | A1 * | 8/2006 | Gu et al. ................... 370/312 |
| 2007/0037548 | A1 * | 2/2007 | Sammour et al. ....... 455/343.2 |
| 2007/0115972 | A1 * | 5/2007 | Jang et al. ................ 370/389 |
| 2007/0147423 | A1 * | 6/2007 | Wentink .................... 370/468 |

FOREIGN PATENT DOCUMENTS

| EP | 1357706 | 10/2003 |
| EP | 1587242 | 10/2005 |

OTHER PUBLICATIONS

Stephens et al., Joint proposal: High throughout extension to the 802.11 standard: MAC. Jan. 2006, retrieved on the Internet at: http://www.ieee802.org/11/DocFiles/05/11-05-1095-05-000n-joint-proposal-mac-specification.doc.
International Search Report for PCT Application PCT/IB2007/000540.

* cited by examiner

Primary Examiner—Meless N Zewdu
(74) Attorney, Agent, or Firm—AlbertDhand LLP (57) ABSTRACT

A system and method for using a single frame to trigger a response from multiple stations in a WLAN network in a scheduled order when in an ad hoc mode. Each responding station responds to the requesting station with an indication of the amount and periodicity of the data stream that the responding stations want to transmit. This allows for an efficient schedule, and a requesting station can go to sleep after it has completed all of its data transactions with the responding stations in the WLAN network.

26 Claims, 6 Drawing Sheets

PSMP frame

| Category | Action Frame type | PSMP Parameter Set (2 bytes) | STA Info repeated N_STA times (N_STA*8 bytes) |
|---|---|---|---|

PSMP Parameter Set

| N_STA | More PSMP | PSMP Sequence Duration |
|---|---|---|
| 5 bits | 1 bit | 10 bits |

FIG. 4

PSMP frame

| Category | Action Frame type | PSMP Parameter Set (2 bytes) | STA Info repeated N_STA times (N_STA*8 bytes) |
|---|---|---|---|

STA_Info field

| TSID | STA ID | DLT Start offset | DLT Duration | ULT Start offset | ULT Duration |
|---|---|---|---|---|---|
| 8 bits | 16 bits | 11 bits | 8 bits | 11 bits | 10 bits |

POWER SAVE IN IBSS MODE OF WLAN OPERATION

FIELD OF THE INVENTION

The present invention relates generally to communication between stations operating within a wireless local area network (WLAN). More particularly, the present invention relates to a system and method of enabling stations operating in an ad hoc mode in a WLAN network to conserve power by sharing information regarding the amount of data that is to be transmitted between stations during an announcement traffic indication message (ATIM) window period.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

An ad hoc mode of operation of WLAN networks is a potential mechanism by which a WLAN network's coverage area can be extended. The ad hoc mode in the 802.11 standard allows a device's radio network interface card (NIC) to operate in what is referred to as an independent basic service set (IBSS) network configuration. With an IBSS, there are no access points. Instead, individual user devices communicate directly with each other in a peer-to-peer manner. There are currently ongoing efforts to define MESH networks, with an intent of configuring a few nodes in the network to operate in an ad hoc mode of operation.

In an ad hoc mode of operation, a requesting station needs to be awake during an ATIM window period which follows a transmitted beacon in order to be informed if any other station in the WLAN network has any data queued for it or if the requesting station has data for another station. If either there is data queued to send to another station, and the other station is awake, or if any other station has data queued for the station at issue, then the requesting station is expected to remain on until the next beacon interval. However, the amount of data destined for respective stations within a WLAN network can be very limited, the data may be periodic, and data frames may belong to different traffic classes. As such, there is a need to limit the amount of signaling that is required to ensure that a WLAN station or piece of equipment is awake to receive the data that is queued for it.

Figure 1:
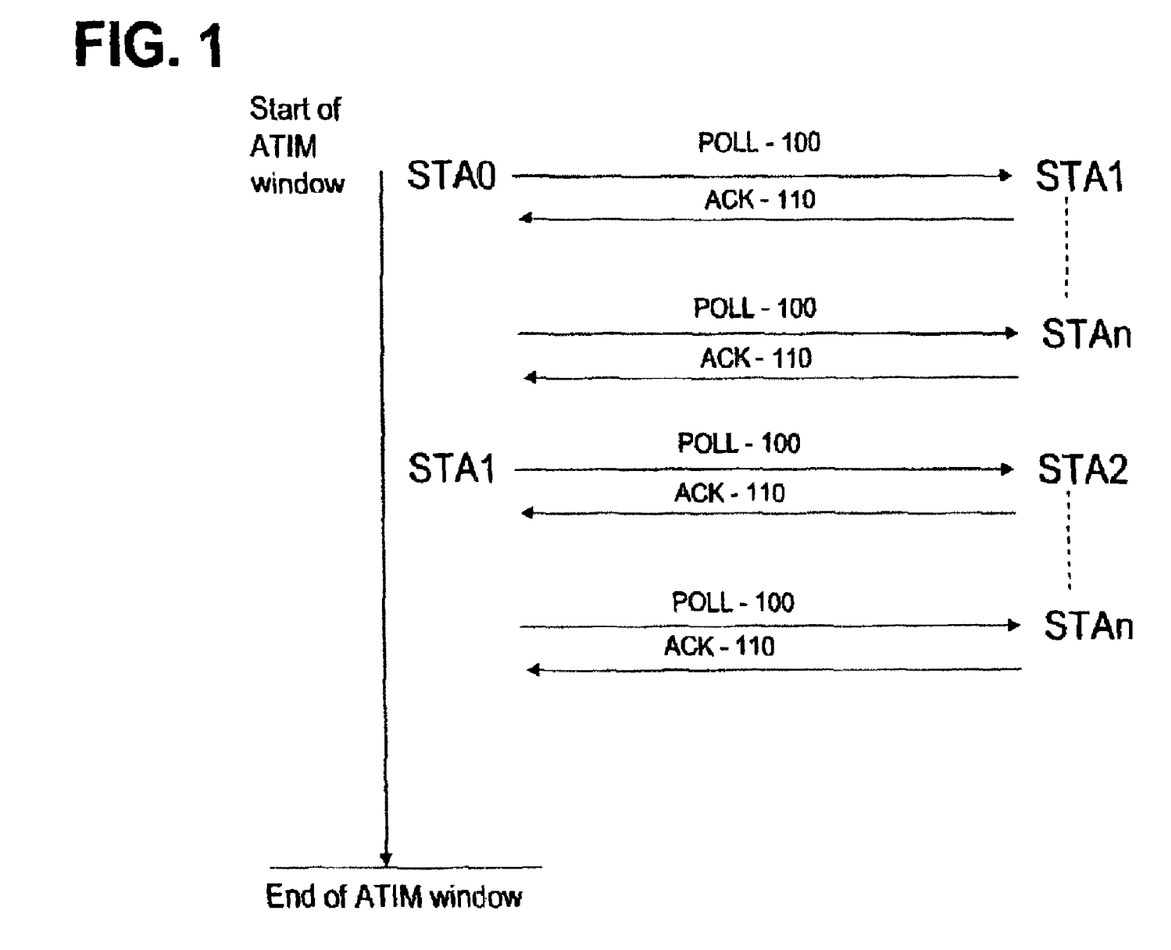
FIG. 1 is a chart showing a conventional process by which individual stations in an ad hoc network learn which other stations are awake in the network, resulting in the requesting station(s) having to stay awake for the entire ATIM period.

FIG. 1 shows how a plurality of stations operating in an ad hoc mode currently operate. During an ATIM period, a requesting station STA0 transmits a separate poll packet 100 to each of a plurality of receiving stations (STA1 to STAn in FIG. 1) to determine if the respective receiving station is awake. If a receiving station is awake, then the respective receiving station transmits an acknowledgment message 110 to the requesting station STA0. The requesting station STA0 then assumes that the receiving station will remain awake until the next ATIM period. The requesting station STA0 that transmits the poll packets 100 maintains a list of receiving stations that transmitted an acknowledgment message 110 to the requesting station STA0. This process occurs for each station within the ad hoc network, as receiving stations become requesting stations and vice versa.

Under this system depicted in FIG. 1, the requesting station STA0 knows whether it can transmit data after the ATIM period or not if there is at least one acknowledgment from any other station (i.e., at least one receiving station responds with an acknowledgment message 110). Also, the requesting station STA0 knows if there is any other station in the system that has data for the requesting station (i.e., any station that has sent the station at issue a poll message 100). However, if even a single receiving station responds with an acknowledgment message 110, then the requesting station STA0 will have to remain awake for the entire ATIM period, as the receiving station, for example STA1, does not know how much data it will receive from the requesting station STA0.

It is therefore desirable to provide a system by which a receiving station STA0 does not have to remain awake until the next ATIM period unless it is necessary to do so.

SUMMARY OF THE INVENTION

The present invention comprises a mechanism that provides power saving for WLAN stations or nodes when operating in an ad hoc mode. The present invention involves the use of a single frame to trigger a response from multiple receiving stations in the network in a scheduled order. The responses from each receiving station can be used to indicate both the amount and periodicity of the data stream that they want to transmit to the requesting station if they have any data. If they do not have any data, the acknowledgement message is an indication that they would be awake until the next beacon. This allows for the creation of an efficient transmission schedule, and each station can go to sleep after it is done with all of its data transactions with different stations in the WLAN network.

With the present invention, stations do not have to negotiate their traffic stream at every beacon interval, and the stations also know the amount of data traffic that they are scheduled to receive and/or transmit to other stations, resulting in an overall throughput gain. Additionally, the present invention provides for a more efficient power saving system, as individual stations know their own schedule for data transmission and reception. Furthermore and unlike some prior systems, no point coordinator is required for coordinating the process of the present invention.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention comprises a mechanism that provides power saving for WLAN nodes when operating in an ad hoc mode. The present invention involves the use of a single frame to trigger a response from multiple receiving stations in the network in a scheduled order. If the responding station has data to transmit to the requesting station, the responses from the receiving station can indicate both the amount and periodicity of the data stream that they want to transmit to the requesting station. If there is no data to be transmitted, the responding station can give an acknowledgment message indicating to the requesting station that it would be awake until the next beacon.

The present invention involves the use of a modified PSMP frame to poll stations in an ad hoc network as to whether the stations have information to transmit. A PSMP frame includes seven reserved bits, a descriptor end (nine bits), and 64 bits of station information.

Figure 3:
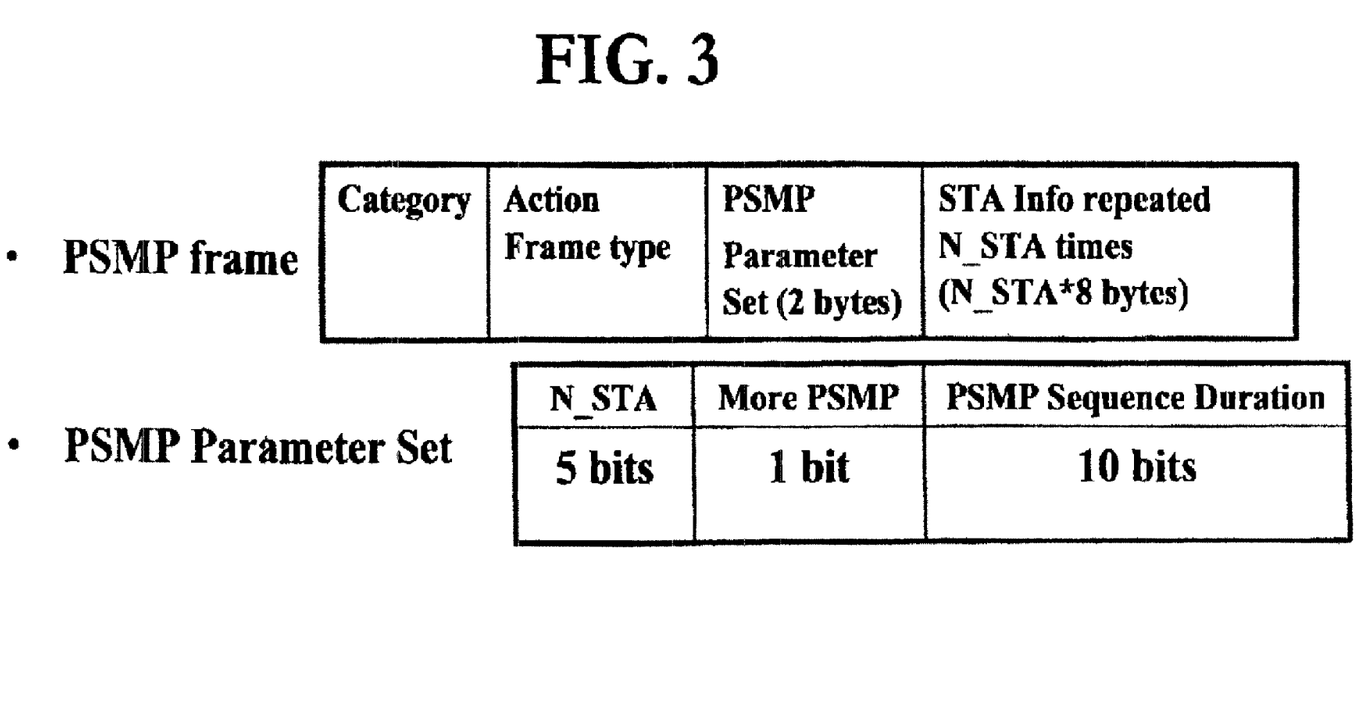
FIG. 3 is a depiction of how a PSMP_IBSS_POLL frame is signaled according to one embodiment of the invention.
Figure 4:
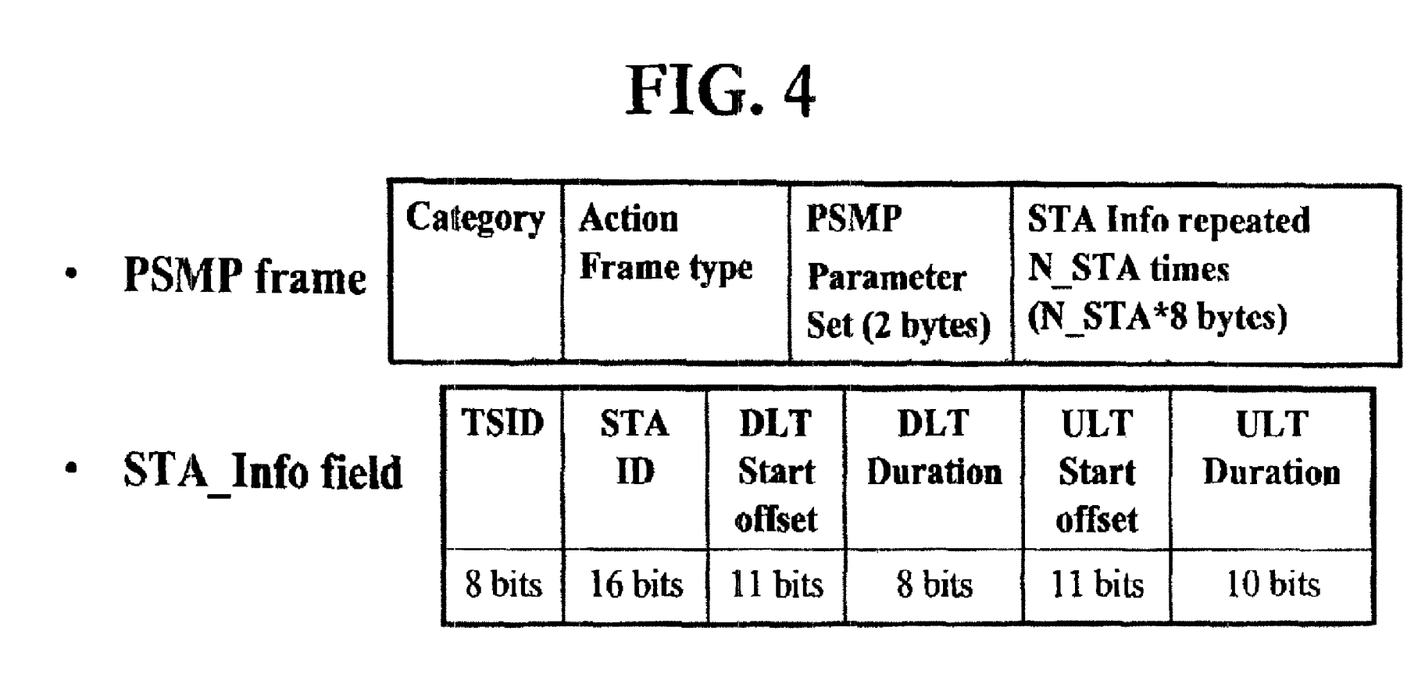
FIG. 4 is a depiction of how a PSMP_IBSS_POLL frame is signaled according to another embodiment of the invention

Table 1 discloses the format of a PSMP Management Action Field according to one embodiment of the present invention and as depicted in FIGS. 3 and 4. The Management Action Field's table "order" refers to the order of the fields in the PSMP frame. Table 2 shows the PSMP Parameter Set Format according to this embodiment.

TABLE 1

| Order | Information | Name | Value |
|---|---|---|---|
| 1 | Category | HT | TBD |
| 2 | Action | PSMP | 2 |
| 3 | PSMP Parameter Set | | |
| 4 ... end | STA Info Repeated N_STA times | | |

TABLE 2

| | N_STA | More PSMP | PSMP Sequence Duration |
|---|---|---|---|
| Bits: | 5 | 1 | 10 |

The "N_STA" field indicates the number of STA Info fields that are present. The "More PSMP" field, when set to 1, indicates whether this PSMP sequence will be followed immediately by another PSMP sequence. When set to 0, the "More PSMP" field indicates that the current PSMP sequence is the last in current the service period. The "PSMP Sequence Duration" field indicates the duration of the current PSMP exchange which is described by the PSMP frame, in units of 8 us, relative to the end of the PSMP frame. Therefore, this field can describe a PSMP exchange of up to 8 ms in duration. Any Sub-PSMP starts a SIFS interval after the indicated duration.

The station information includes two bytes (sixteen bits) as shown in FIG. 4. In one embodiment, the station identification information (STAID) for the infrastructure mode is the Association ID (AID) of the STA, and in ad hoc mode, the field has the least significant bit (LSB) of the media access control (MAC) address. There are also twenty-one bits of downlink information, as shown in FIG. 4,—eleven bits for the downlink start offset and ten bits for the downlink duration. In addition, there are twenty-one bits of uplink information, eleven bits for the uplink start offset and ten bits for the uplink duration. Lastly, the station information includes six reserved bits.

Table 3 shows the "STA Info" field format. The "STA ID" field indicates the AID value for the BSS mode of operation and 16 LSBs of MAC address in IBSS mode of operation. Broadcast and multicast data can be transmitted using PSMP by setting the STA_ID to a specific value of 0 in one embodiment of the invention.

TABLE 3

| | TSIDs set | STA ID | DLT Start Offset | DLT Duration | ULT Start Offset | ULT Duration |
|---|---|---|---|---|---|---|
| Bits: | 8 | 16 | 11 | 8 | 11 | 10 |

The modified PSMP frame of the present invention comprises a PSMP_IBSS_POLL frame that is broadcast from a requesting device STA0. In one embodiment of the invention, a PSMP frame can have the first STA_INFO field have STA_ID=0 (reserved for multicast/broadcast), and TSID set=All 1's (11111111) is used to indicate the PSMP_IBSS_POLL frame. It is possible to use the rest or a subset of the fields, i.e, the DLT Start offset, DLT Duration, ULT Start Offset, ULT Duration fields, to indicate a multicast group to which the poll message is directed. This particular embodiment is referred to herein as a "poll frame indication in STA_INFO field". In another embodiment, additional bytes can be added to the PSMP Parameter Set field to have reserved bits, and one of the reserved bits can be used to indicate that this is a PMSP_IBSS_POLL frame. This embodiment is referred to as a "poll frame indication by PSMP parameter set".

In the embodiment where the poll frame is indicated in STA_INFO field is used, the STA_INFO fields following the first STA_INFO field, and in the other embodiment where the "poll frame is indicted by PSMP parameter set" starting from the first STA_INFO field is used, can carry the information of the complete or a subset of the stations to which the poll message is sent. The STA_INFO field can have the size of the downlink information field set to zero, effectively reducing the size of the PSMP frame. At the same time, if the size of the PSMP frame is not changed, then the additional bytes can be used to indicate additional bytes of the MAC address or the station identification. Alternatively, the downlink information field can be used to indicate a subset of the traffic specification (TSPEC). TSPEC elements define the characteristics of the traffic stream of the station which sends elements. TSPEC elements describe characteristics of traffic streams, such as data rate, packet size, delay, and service interval. TSPEC elements contain fifty-seven bytes of information. These elements are broken down as follows:

Element ID=1 byte
Length=1 byte
TS Info=3 bytes
Nominal MAC Service Data Unit (MSDU) Size=2 bytes
Maximum MSDU Size=2 bytes
Minimum Service Interval=4 bytes
Maximum Service Interval=4 bytes
Inactivity Interval=4 bytes
Suspension Interval=4 bytes
Service Start Time=4 bytes
Minimum Data Rate=4 bytes Mean Data Rate=4 bytes
Peak Data Rate=4 bytes
Burst Size=4 bytes
Delay Bound=4 bytes
Minimum Physical Layer Protocol (PHY) Rate=4 bytes
Surplus Bandwidth Allowance=2 bytes
Medium Time=2 bytes In a second embodiment of the invention, the downlink information fields in the STA_INFO field can be set to null, resulting in no changes to the current PSMP frame. Instead, this can be used to indicate to the receiving stations that they should respond with an indication of the amount of data that they have to transmit their TSPEC during the period when they are allowed to use the medium.

Figure 2:
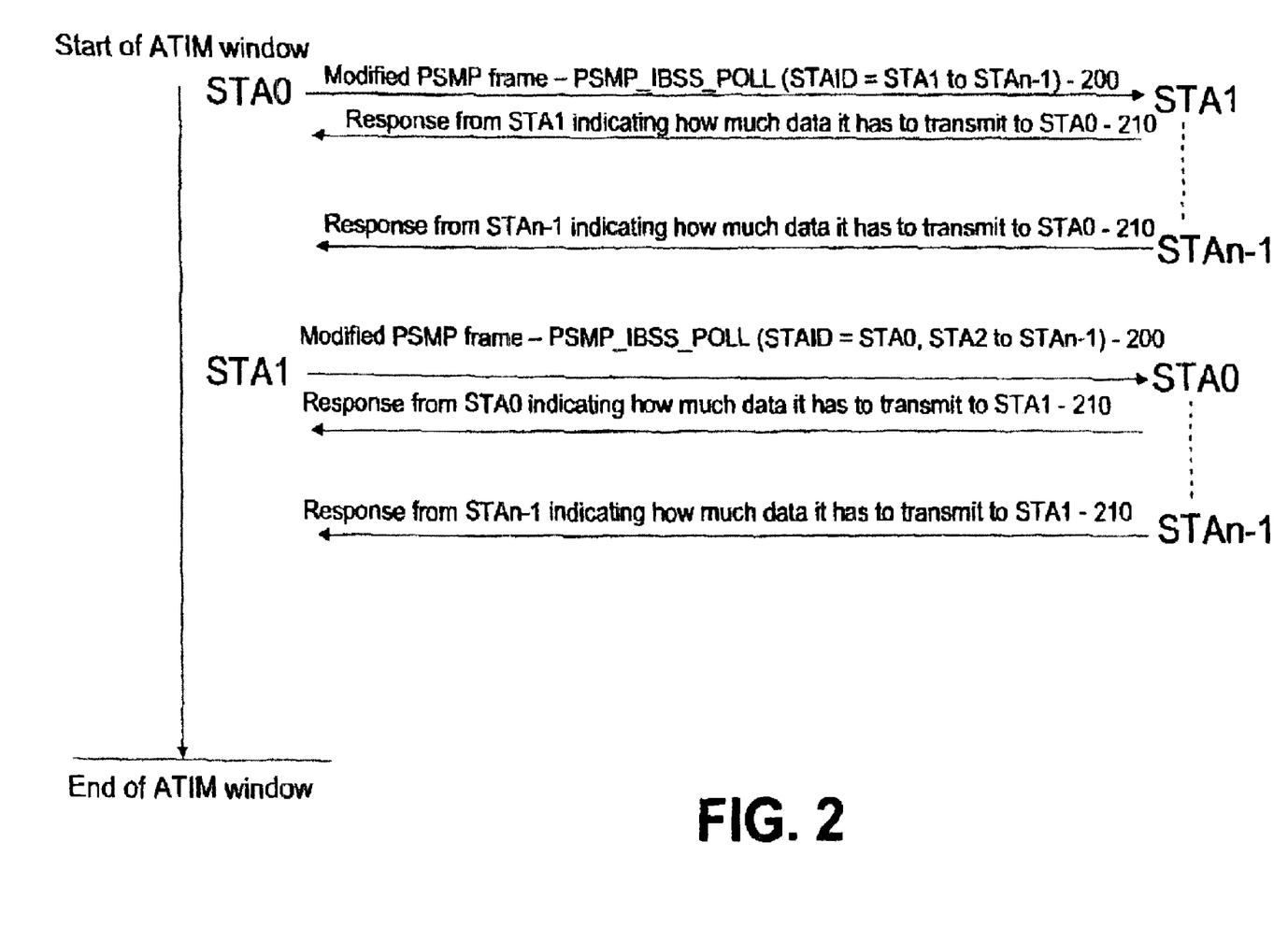
FIG. 2 is a chart showing the implementation of one embodiment of the present invention, where a modified power save multipoll (PSMP) frame is used to elicit responses from other stations in the network as to how much data is to be transmitted to the requesting station and to keep them awake if the requesting station has data for them.

FIG. 2 shows a process by which the present invention is implemented. At step 200 in FIG. 2, a requesting station STA0 broadcasts a modified PSMP frame, in the form of PSMP_IBSS_POLL (STAID=STA1 to STAn−1), indicating that all of the other stations should respond if active. At step 210, each of the other stations (STA1 to STAn−1) that are active respond to the previous message with an indication of how much data the respective station or stations has to transmit to the requesting station STA0. This response can include the respective station's TSPEC. The response from the receiving STA is assumed to be an implicit ACK to the request by the transmitter. If there is no data to be transmitted, the receiving STA will send an ACK message indicating to the transmitter that it is awake. This process repeats itself for every active station as of the start of the ATIM window. At the end of the ATIM window, each of the stations know which of the other stations in the network (1) are going to be active until the start of the next ATIM window or beacon period, and (2) the amount of data that each of the other devices have to transmit or receive. By having this information, each station can go to sleep after it has transmitted and received all of the information that is to be sent involving the station during the ATIM window.

There are a number of different options for how to indicate the amount of data that is to be transferred using the PSMP_IBSS_POLL message. In one embodiment, a subset of the TSPEC is used, with the subset being sufficient to allocate resources until the end of the current beacon interval. In another embodiment, in response to the PSMP_IBSS_POLL message, receiving stations can transmit their TSPEC's, and stations that are transmitting a PSMP_IBSS_POLL message must wait until they receive a PSMP_IBSS_POLL message from another device to indicate their own TSPEC.

At the end of the ATIM window, the station that wins a contention among all of the stations transmits a PSMP frame. The stations that either have data to receive or to transmit (or both) to the winning station are included in the subsequent PSMP exchange. The time allocated to each station is based upon the data to be transmitted. Once a station has completed its transactions, it can go to sleep, even if that point is before the end of the then-current beacon interval. The use of the PSMP_IBSS_POLL frames can eliminate the need for the multiple POLL messages from each requesting station as depicted in FIG. 1. These frames also help stations allocate resources (i.e., schedule transmissions) based upon the amount of data that needs to be exchanged until the end of the current beacon interval.

Figure 5:
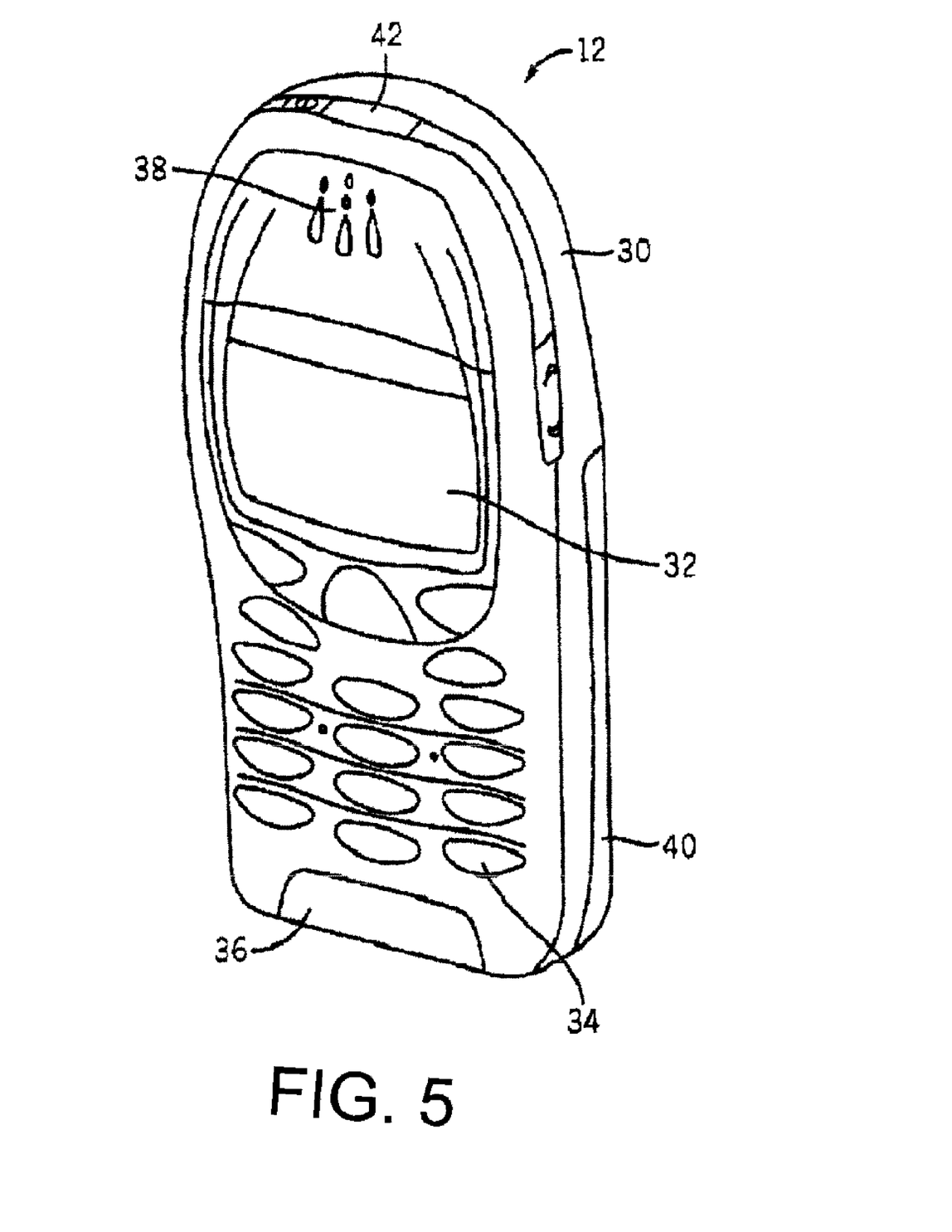
FIG. 5 is a perspective view of an electronic device that can be used in the implementation of the present invention.
Figure 6:
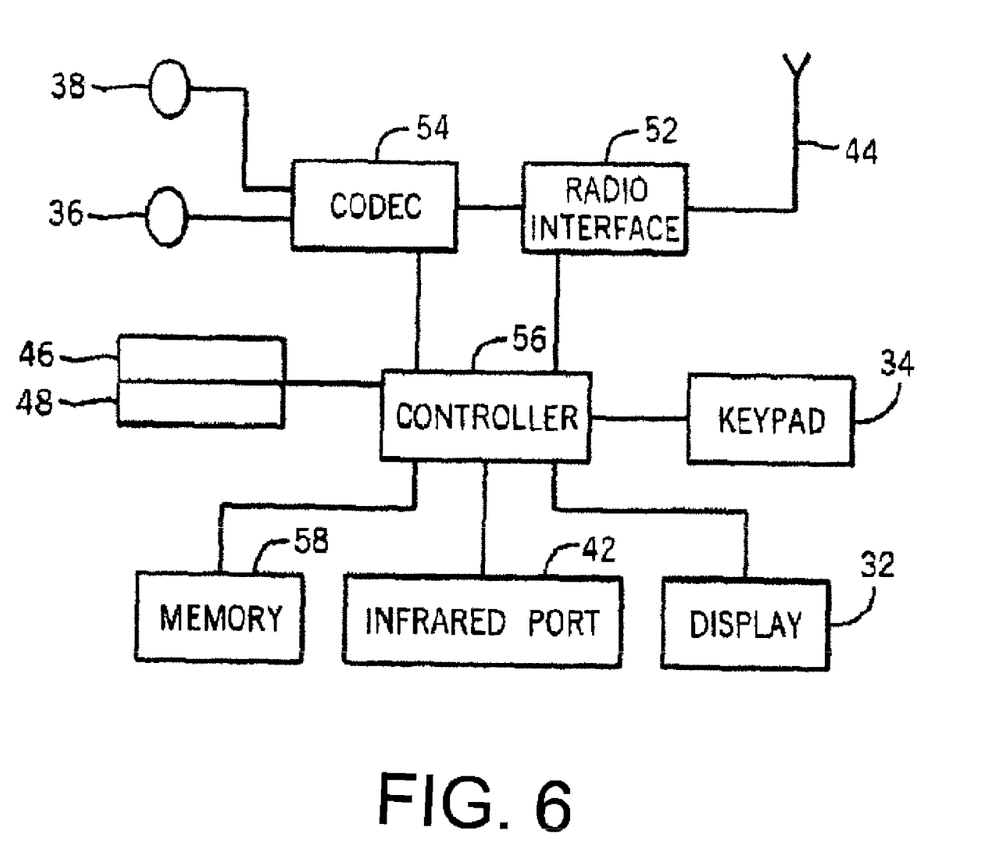
FIG. 6 is a schematic representation of the circuitry of the mobile telephone of FIG. 5.

FIGS. 5 and 6 show one representative electronic device 12 within which the present invention may be implemented. It should be understood, however, that the present invention is not intended to be limited to one particular type of mobile telephone or other electronic device. The electronic device 12 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various communication devices may communicate using transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. Computer code implementing the processes of the present invention can be encoded on a wide variety of computer-readable media, including but not limited to a computer hard drive, floppy discs, compact discs, zip drives, and carrier waves. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of using a requesting station to communicate with a plurality of other stations within an ad hoc wireless local area network, comprising:

after the beginning of an announcement traffic indication message window period, broadcasting from the requesting station a first power save multipoll frame to the ad hoc network, the first power save multipoll frame including an indication for all receiving stations to respond to the first power save multipoll frame and to indicate how much data the respective receiving station has to transmit to the requesting station; and receiving an indication of which receiving stations are active and the amount of data that each active receiving station has to transmit to the requesting station.

2. The method of claim 1, wherein the first power save multipoll frame comprises a power save multipoll independent basic service set poll PSMP_IBSS_POLL) frame.

3. The method of claim 2, wherein the PSMP_IBSS_POLL frame is indicated by a station identification (STA_ID) of 0 and a traffic stream identifier (TSID) set of all 1's in the first power save multipoll frame.

4. The method of claim 3, wherein fields other than the STA_ID and the TSID are used to indicate a multicast group to which the first power save multipoll frame is directed.

5. The method of claim 2, wherein a reserved bit added to a power save multipoll Parameter Set field is used to indicate the PSMP_IBSS_POLL frame.

6. The method of claim 3, wherein a downlink information field of the first power save multipoll frame is set to zero.

7. The method of claim 6, wherein bytes freed by having the downlink information set to zero are used to include in the first power save multipoll frame at least one of:
   bytes of the requesting station's media access control address; and
   bytes of identification information for the requesting station.

8. The method of claim 2, wherein at least one bit of the first power save multipoll frame is used to inform the receiving stations that they should indicate how much data the respective receiving station has to transmit to the requesting station.

9. The method of claim 2, wherein at least one bit of the first power save multipoll frame is used to inform the receiving stations that they should transmit their respective traffic specifications to the requesting station.

10. The method of claim 1, further comprising maintaining a list of all receiving stations that responded to the response to the first power save multipoll frame, the list including information regarding the identities of the responding receiving stations and how much data is to be transmitted from each responding receiving station to the requesting station.

11. The method of claim 10, further comprising, after the end of the announcement traffic indication message window period, exchanging data with each of the active requesting stations in an order based upon the amount of data to be transmitted by the requesting station and each receiving station.

12. The method of claim 11, further comprising, after the requesting station has exchanged all of the data with the active receiving stations according to the maintained list, entering into a sleep mode.

13. The method of claim 1, further comprising:
   receiving a second power save multipoll frame from one of the receiving stations, the second power save multipoll frame including a request to respond to the power save multipoll frame and to indicate how much data the requesting station has to transmit to the receiving station that transmitted the second power save multipoll frame; and
   in response to the second power save multipoll frame, transmitting information concerning the amount of data that the requesting station has to transmit to the receiving station that transmitted the second power save multipoll frame.

14. A requesting station configured to operate within an ad hoc wireless local area network, comprising:
   at least one processor; and
   at least one memory including computer program code, the at least one memory and the computer program code, working with the at least one processor, causes the requesting station to:
   after the beginning of an announcement traffic indication message window period, broadcast a first power save multipoll frame to the ad hoc network, the first power save multipoll frame including an indication for all receiving stations to respond to the first power save multipoll frame and to indicate how much data a respective receiving station has to transmit to the requesting station; and
   receive an indication of which receiving stations are active and the amount of data that each active receiving station has to transmit to the requesting station.

15. A method of having a receiving station provide communication information to a requesting station in an ad hoc wireless local area network, comprising:
   receiving, at the receiving station, a power save multipoll frame from the requesting station, the power save multipoll frame including a request to respond with an indication as to how much data is to be transmitted to the requesting station; and
   in response to the power save multipoll frame, transmitting information concerning the amount of data that is to be transmitted to the requesting station.

16. The method of claim 15, wherein the power save multipoll frame comprises a power save multipoll independent basic service set poll (PSMP_IBSS_POLL) frame.

17. The method of claim 16, wherein the PSMP_IBSS_POLL frame is indicated by a traffic stream identifier (TSID) of 0 and a transmitting station identification (TSID) set of all 1's in the power save multipoll frame.

18. The method of claim 17, wherein fields other than the STA_ID and the TSID are used to indicate a multicast group to which the first power save multipoll frame is directed.

19. The method of claim 16, wherein a reserved bit added to a power save multipoll Parameter Set field is used to indicate the PSMP_IBSS_POLL frame.

20. The method of claim 15, wherein a downlink information field of the power save multipoll frame is set to zero.

21. The method of claim 20, wherein bytes freed by having the downlink information set to zero are used to include in the first power save multipoll frame at least one of:
   bytes of the requesting station's media access control address; and
   bytes of identification information for the requesting station.

22. The method of claim 15, wherein at least one bit of the power save multipoll frame is used to inform the receiving station that it should indicate how much data is to be transmitted to the requesting station.

23. The method of claim 15, wherein at least one bit of the power save multipoll frame is used to inform the receiving station that it should transmit its traffic specifications to the requesting station.

24. A receiving station configured to communicate with other stations in an ad hoc wireless local area network, comprising:
   at least one processor; and
   at least one memory including computer program code, the at least one memory and the computer program code, working with the at least one processor, causes the receiving station to:

receive a power save multipoll frame from a requesting station, the power save multipoll frame including a request to respond to the power save multipoll frame and to indicate how much data is to be transmitted to the requesting station; and in response to the power save multipoll frame, transmit information concerning the amount of data that is to be transmitted to the requesting station.

25. An ad hoc wireless local area network, comprising a plurality of stations, each of the plurality of stations including:

computer code for, after the beginning of an announcement traffic indication message window period, broadcasting a first power save multipoll frame to the ad hoc network, the first power save multipoll frame including an indication for all other stations within the ad hoc network to respond to the first power save multipoll frame and to indicate how much data the other stations have to transmit to the station that transmitted the first power save multipoll frame; and computer code for receiving an indication of which other stations in the ad hoc network are active and the amount of data that each of the other stations has to transmit to the station that transmitted the first power save multipoll frame.

26. The ad hoc wireless local area network of claim 25, wherein each station further comprises:

computer code for receiving a second power save multipoll frame from another station within the ad hoc network, the second power save multipoll frame including a request to respond to the second power save multipoll frame with an indication of how much data is to be transmitted to the station that transmitted the second power save multipoll frame; and computer code for, in response to the second power save multipoll frame, transmitting information concerning the amount of data that is to be transmitted to the station that transmitted the second power save multipoll frame.

* * * * *